April 3, 1962  N. A. NELSON  3,028,050
FLUID MEASURING SYSTEM
Filed Jan. 9, 1961  2 Sheets-Sheet 1

INVENTOR.
NORMAN A. NELSON,
BY Frank S. Troidl
ATTORNEY.

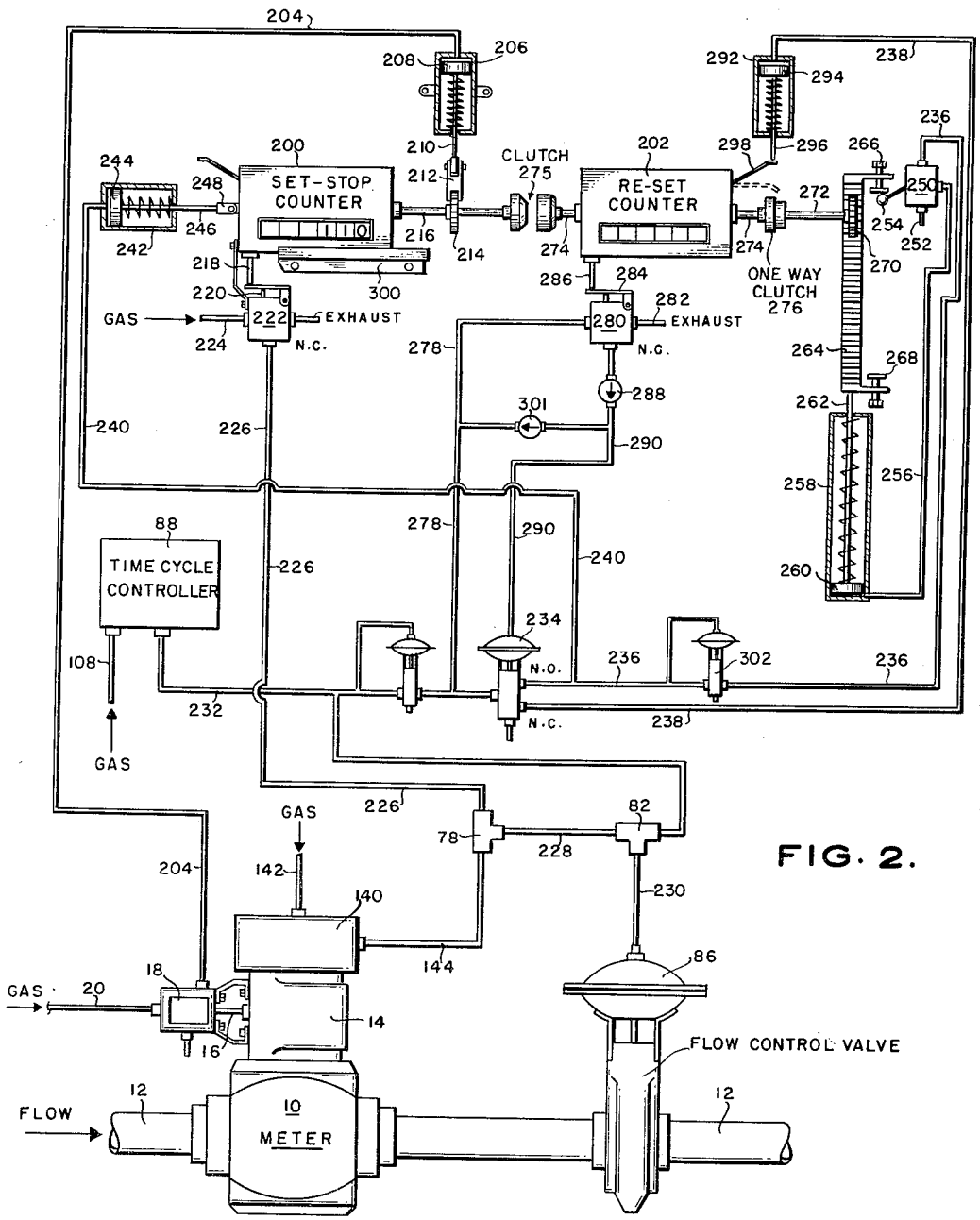

United States Patent Office 3,028,050
Patented Apr. 3, 1962

3,028,050
FLUID MEASURING SYSTEM
Norman A. Nelson, South Houston, Tex., assignor, by mesne assignments, to Jersey Production Research Company, Tulsa, Okla., a corporation of Delaware
Filed Jan. 9, 1961, Ser. No. 81,492
4 Claims. (Cl. 222—16)

This invention relates to the measurement of quantities of fluids or flowing fluids. More particularly, this invention is an automatic system for limiting the quantity of fluid flowing through a pipeline during a first predetermined time period and providing for the make-up of the limit during a second predetermined time period if the limit is not reached during the first predetermined time period.

Under some circumstances, it may be desirable or required by law that the amount of fluid flowed through a pipeline be limited to a predetermined limit during a predetermined time period. For example, some oil-producing states require under their conservation policy that the amount of oil produced from a particular lease be limited to a predetermined maximum per day. The number of allowed producing days per month is also stipulated by the proper administrative agency of the state. The maximum amount of oil allowed to be flowed from a particular lease per day is termed the "daily allowable." The maximum amount of oil allowed to be produced from a particular lease within a monthly period is called the "monthly allowable."

Assume, for example, that for a particular lease a "daily allowable" of 100 barrels per day is permitted. Assume further that the number of producing days permitted for a particular month is, say 15 days. Thus, a maximum of 1,500 barrels can be produced from the lease with a maximum average per day of 100 barrels.

Thus, in an automatic fluid measuring system, some means must be provided for stopping the flow of fluid through a pipeline if the "daily allowable," of say 100 barrels, is obtained before the end of the day. The system must then reset the meter for counting the amount of fluid flowed through the pipeline when the second day's allowable is to be produced. If during the first day the "daily allowable" is not flowed through the pipeline by the end of the day, an automatic system must provide for the make-up of the difference between the "daily allowable" and the actual amount flowed through the pipeline. The make-up is accomplished during the second day to flow 200 barrels for two days or 100 barrels per day. Also, when the "monthly allowable" of, say 1,500 barrels, is flowed through the pipeline, some means must be provided for automatically shutting off the flow of fluid through the pipeline. This invention provides the art with such a system.

The invention as well as its many advantages will be understood by reference to the following detailed description and drawings in which:

FIG. 2 is a schematic view showing a second embodiment of the invention.

Figure 1:
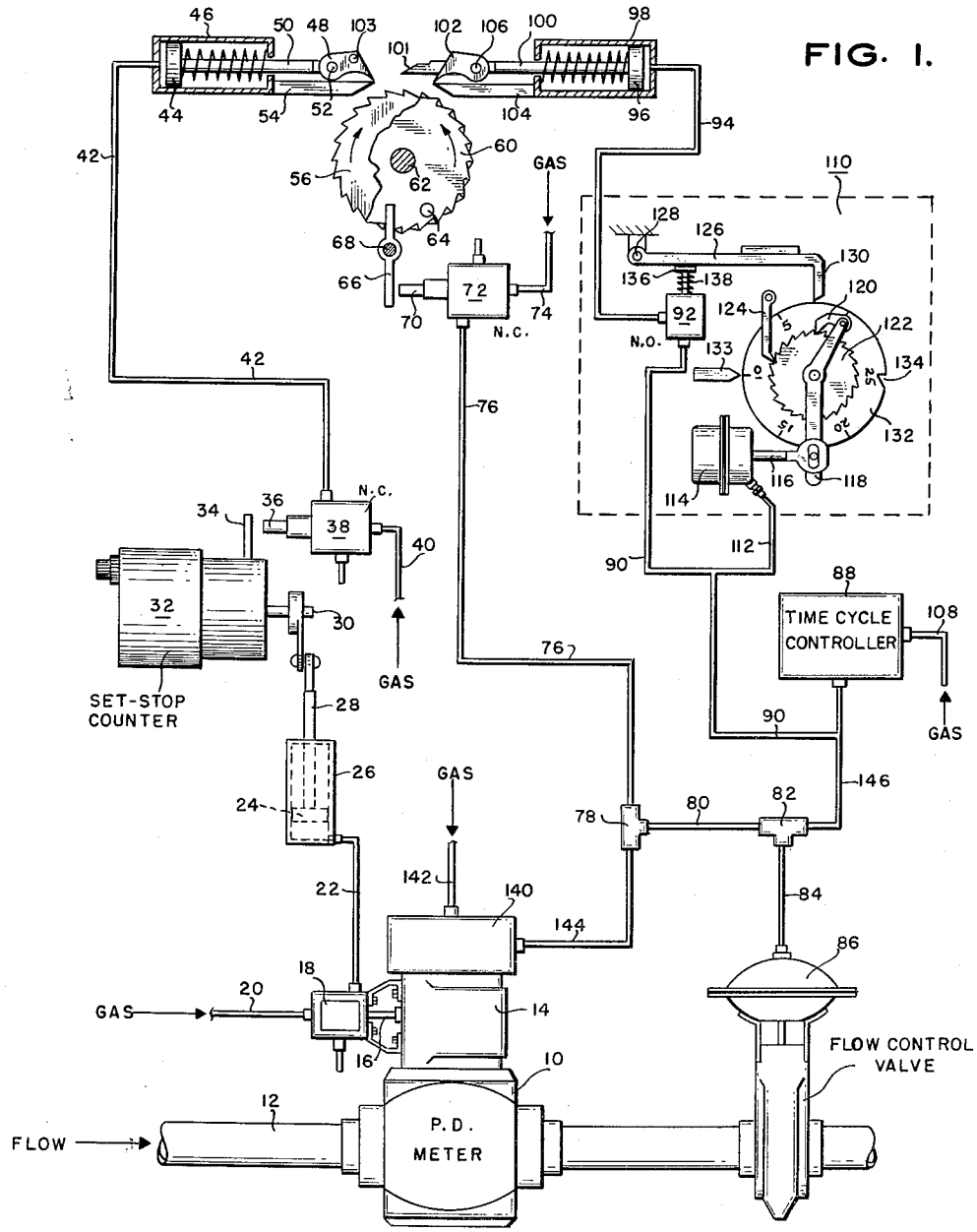
FIG. 1 is a schematic view showing one embodiment of the invention.

Referring to FIG. 1, a meter 10 is shown mounted about a pipeline 12. The meter 10 is used to measure the quantity of fluid flowed through the pipeline 12.

The upper housing 14 of the meter 10 includes some means such as shaft 16 for controlling a valve 18. Valve 18 controls the flow of gas from a gas supply line 20 through valve 18 and into gas line 22. Movement of shaft 16 by some means such as a cam system (not shown) in upper housing 14 opens and then closes valve 18 in response to successive equal increments of fluid flow, say in one-barrel increments, through the pipeline. Thus, each time a barrel of oil flows through pipeline 12, a gas pulse is fed from supply line 20 through valve 18 and into gas line 22 to operate against a piston 24 within the piston cylinder 26.

The shaft 28 of piston 24 is coupled to a rotatable shaft 30. The shaft 30 extends into a set-stop counter 32. The set-stop counter 32 includes a counter which can be rotated successive equal amounts by successive movements of the piston 24. When the counter (not shown) within the set-stop counter 32 rotates a predetermined amount proportional to the limit of fluid flow through the pipeline, a lever 34 is actuated to move the valve stem 36 on valve 38 toward the right (looking at FIG. 1).

Thus, for example, if the "daily allowable" is 100 barrels, each time one barrel flows through pipeline 12, a pulse is transmitted against piston 24. The counter in set-stop counter 32 is moved an equal amount each time piston 24 is actuated. After 100 actuations of the counter in set-stop counter 32, the lever 34 is moved against valve stem 36 to open valve 38.

The particular set-stop counter shown in FIG. 1 is of the type that can be rotated in one direction until the "daily allowable" is obtained and then at the same time that the lever 34 is actuated, the counter's rotation is automatically reversed; and the counter is set to count the "daily allowable" by rotating in the opposite direction. At the end of the second, count cycle lever 34 is actuated against; and simultaneously the rotation of the counter is reversed again. One such system is called a Cyclo-Monitor obtainable from the Counter and Control Corporation of Milwaukee, Wisconsin, and described in their bulletin 203–A entitled "Instructions for Installation and Operation of Cyclo-Monitors."

The normally closed valve 38 controls the flow of gas from the gas supply 40 through valve 38 to the gas line 42 to the piston 44 which is spring biased within piston cylinder 46. A pawl 48 is mounted on the piston shaft 50 of piston 44 by means of a pivot pin 52. The shaft 50, when piston 44 is actuated, slides along the pawl support 54; and the pawl 48 engages one of the teeth on a ratchet 56.

A second ratchet 60 is also provided in the system. Ratchet 56 and ratchet 60 have oppositely facing teeth and are mounted about a common rotatable shaft 62. Hence, when the teeth 56 are contacted by pawl 48, the shaft 62 is rotated clockwise; when the ratchet 60 is contacted by a pawl 102, the rotation of shaft 62 is counterclockwise.

A pin 64 extends outwardly from the ratchet 60 and is rotatable therewith when shaft 62 rotates. When the clockwise rotation of pin 64 is such that a valve actuator 66 is contacted, valve actuator 66 rotates about pivot 68 to engage a valve stem 70 within a normally closed gas valve 72. The opening of stem 70 causes gas from a gas supply 74 to flow through valve 72, gas line 76, shuttle valve 78, gas line 80, shuttle valve 82, and gas line 84 to a diaphragm valve 86. When the gas valve 72 is opened by the actuator 66 the flow of gas through lines 76, 80, and 84 to the diaphragm 86 shuts off the flow of fluid through pipeline 12.

A time cycle controller 88 is connected to a gas line 90 leading through normally open gas valve 92 and gas line 94 to a piston 96 which is spring biased within a piston cylinder 98. The shaft 100 of piston 96 has mounted within the end thereof the pawl 102 which slides upon the guide 104 and falls over the edge of the guide 104 by pivoting about pivot pin 106 when the piston 96 is actuated, contacting a tooth on ratchet 60 and rotating ratchet 60 in a counterclockwise direction, thus moving the rotatable shaft 62 in the counterclockwise direction.

Movement of shaft 100 to the left in FIG. 1 would cause a beveled extension 101 of the shaft 100 to move to the left a corresponding distance. If pawl 48 is in contact with ratchet 56, the beveled extension 101 would contact a pin 103 extending outwardly from pawl 48, raising pawl 48 out of contact with ratchet 56, so the ratchets 56 and 60 could be rotated counterclockwise. Time cycle controller 88 controls the flow of gas from a gas supply 108.

The normally open valve 92 may form a part of a system for initially setting the number of producing days. This system is indicated by the broken lines 110. A gas line 112 is connected to gas line 90 and leads to a diaphragm type actuator 114. Upon receipt of each pulse, the actuator 114 moves a shaft 116 connected to actuator 118. The actuation of actuator 118 causes a pawl 120 to rotate a ratchet 122 to reduce the remaining producing days by one day. Reverse movement of ratchet 122 is prevented by means of pawl 124.

A weight bar 126 is pivotable about pivot 128 and has a downwardly extending member 130 which rests on the producing days indicating wheel 132. The indicating wheel 132 may be provided with lines equal in number to the teeth on ratchet 122, equally spaced about its circumference and numbered to show the number of producing days remaining. The number in the line adjacent to a fixed pointer 133 on any particular day would show the number of producing days remaining in the month. A notch 134 in the indicating wheel 132 would be so placed as to arrive at the downwardly extending member 130 of weight bar 126 at the same time that the "zero" line arrives at the pointer 133. The weight bar 126 also rests upon a valve stem 136 extending into the normally open valve 92. The valve stem 136 is biased upwardly by means of spring 138 wrapped about the stem 136. When the notch 134 in the indicating wheel 132 arrives at the downwardly extending member 130 of the weight bar 126, the weight bar would be allowed to fall and cause normally open valve 92 to be closed, thus shutting off the flow of gas through gas line 94 to piston 96 and at the same time allowing any gas in line 94 or cylinder 98 to exhaust through valve 92 to the atmosphere.

In order to shut off the flow of oil if the "monthly allowable" has been flowed through pipeline 12, say 1,500 barrels, a shaft from meter 10 (not shown) and extending through portion 14 also actuates a valve (not shown) in the "monthly allowable" counter 140 connected to the neck 14 of the meter 10. Actuation of the "monthly allowable" counter 140 causes gas from a gas supply 142 to flow through line 144, shuttle valve 78, gas line 80, shuttle valve 82, and gas line 84 to the diaphragm valve 86 to shut off the flow of oil through the pipeline 12.

To explain the operation of the embodiment of FIG. 1, assume that the "daily allowable" for the flow of oil through pipeline 12 is 100 barrels a day. Also, assume that the number of producing days is 15 so that the "monthly allowable" is 1,500 barrels. Thus, a maximum of 1,500 barrels may be produced for the month, and a maximum of 100 barrels may be produced for the day through the pipeline 12.

At the beginning of the month the entire system must be set up for the month. The "monthly allowable" counter 140 is set at 1500, the set-stop counter 32 is set at 100, and the producing days indicating wheel is set at 15. Also, the ratchet wheels 56 and 60 are rotated clockwise so the pin 64 contacts valve actuator 66 and rotates it about pivot 68 causing normally closed valve 72 to open. Then, at the beginning of the first day of the month, the time cycle controller 88, at a predetermined time, say 7:00 a.m., allows a pulse of gas to pass from gas supply 108, through itself, through gas line 146, to shuttle valve 82; and also through gas line 90, through normally open valve 92, through gas line 94, into cylinder 98, moving piston 96 to the left, and causing ratchet wheels 60 (and 56) to rotate counterclockwise the amount of one tooth, allowing normally closed valve 72 to close. Also, at the same time, the gas pulse passing through gas line 90 would be directed through connecting gas line 112 to diaphragm actuator 114. This causes actuator arm 118 to be cocked. Now, when normally closed valve 72 is allowed to close, the gas pressure in line 80 is released and shuttle valve 82 is shifted, causing the gas pressure in line 146 to be opened to gas line 84 and transferring control of the flow control valve 86 to the time cycle controller 88.

After a predetermined period of time, say five minutes, the time cycle controller 88 would cause the gas flow from gas line 108 to gas line 146 to be shut off, and the gas within gas line 146 and connecting lines and members would be exhausted to the atmosphere. This would allow piston 96 to be moved back to the right by its spring, diaphragm actuator 114 to be returned to normal position by its spring (this would also cause actuator 118 to rotate counterclockwise and thereby cause the indicating wheel 132 to rotate counterclockwise one day to fourteen days), and allow the flow control valve 86 to open, thus allowing the flow of fluids through pipeline 12, positive displacement meter 10, and flow control valve 86 to begin.

As each barrel of oil flows through pipeline 12 and is detected by meter 10, the valve 18 is opened to cause a gas pulse to be generated through line 22 against piston 24 to move the counter (not shown) within the set-stop counter 32. The counter is moved thereafter an equal distance in one direction each time a pulse is transmitted against the piston 24. If, before the end of the day, 100 barrels flow through meter 10 so that the counter in set-stop counter 32 is actuated 100 times, the lever 34 is moved to open valve 38. This causes gas from gas supply 40 to flow through valve 38, line 42, and against piston 44 to cause pawl 48 to engage the teeth of ratchet 56. The rotation of ratchet 56 clockwise causes pin 64 to contact actuator 66 which then moves valve stem 70 to open the normally closed valve 72.

When valve 72 is opened, gas from gas supply 74 flows through the valve and then through line 76, shuttle valve 78, gas line 80, shuttle valve 82, gas line 84, and into the diaphragm valve 86 to shut off the flow of oil through pipeline 12.

At the end of 24 hours or the beginning of the next producing day, the cycle described above is repeated.

Assume, however, that at the end of the first producing day, the "daily allowable" is not flowed through pipeline 12. Assume that only 90 barrels were flowed through the pipeline 12. In this case the counter in set-stop counter 32 rotated only 90 equal distances, leaving 10 more to go before the lever 34 is actuated and simultaneously the counter in set-stop counter 32 is automatically reversed in rotation. Thus, the valve 38 remained closed throughout the day, and the ratchet 56 remained unactuated.

At the beginning of the next day's production period, a pulse from time cycle control 88 moves the ratchet 60 a predetermined distance equal to the distance the pin 64 was moved prior to the beginning of the first day's production. Hence, pin 64 is now twice the distance from actuator 66 as it was at the beginning of the first day's production.

During the second day's production, when the 10 barrels which had to be made up are flowed through pipeline 12, the actuator 34 is actuated to open valve 38. The ratchet 56 is then rotated clockwise to move the pin 64 half the distance to actuator 66. This occurs without stopping the flow of oil through pipeline 12.

If, thereafter the 100 barrels "daily allowable" is obtained, the set-stop counter 32 again actuates lever 34 to open valve 38, thus causing ratchet 56 to be moved clockwise to actuate the actuator 66 and open valve 72. This causes the diaphragm valve 86 to be closed to shut off the flow of oil through pipeline 12.

At the beginning of the fifteenth day, the pulse through lines 90 and 112 moves the notch 134 of the remaining producing days wheel 132 to adjacent the downwardly extending portion 130 of weight bar 126. The downwardly extending portion 130 falls into the notch 134 so that the weight bar 126 pivots about 128 and closes the valve stem 136 against the bias of spring 138. Valve 92 is thus shut off so that the ratchet 60 can no longer be rotated. Also, when the "monthly allowable" of 1,500 barrels, in this example, is obtained, the "monthly allowable" counter 140 opens a valve to cause gas from gas supply 142 to flow through line 144, shuttle valve 78, line 80, shuttle valve 82, and line 84 to shut off the flow of oil through pipeline 12.

A second embodiment of this inention is shown schematically in FIG. 2. Like parts in FIG. 2 to like parts in FIG. 1 are referred to by like numerals. The set-stop counter 200 of FIG. 2 is of the odometer type. Set-stop counter 200 is different from set-stop counter 32 of FIG. 1 in that whereas the set-stop counter 32 of FIG. 1 resets itself automatically when the "daily allowable" is obtained, the set-stop counter 200 must be reset by some external means. The reset counter 202, also of the odometer type, is used for resetting the set-stop counter 200. The manner in which this is done will be subsequently described.

In FIG. 2, a gas line 204 leads from the pulse generator 18 to a cylinder 206 containing a piston 208 which is spring biased. The piston shaft 210 has connected at its outer end a pawl 212 which is adapted to engage a ratchet wheel 214 about the set-stop counter shaft 216.

Each time a pulse is generated from pulse generator 18, the piston 208 is actuated to move pawl 212 a distance sufficient to rotate the shaft 216 for 1 count on the set-stop counter 200. If the set-stop counter 200 is set for, say 100 barrels "daily allowable," when the set-stop counter returns to the zero position, a mechanism in the counter (not shown) actuates an actuator 218 which changes the position of pin 220 of a normally closed valve 222. When valve 222 is open, gas from a gas supply 224 flows through valve 222, gas line 226, shuttle valve 78, line 228, shuttle valve 82, and line 230 to the diaphragm 86 to close off the valve and stop flow of oil through pipeline 12.

The gas line 232 from the time cycle controller 88 leads to a five-way diaphragm valve 234. The diaphragm valve 234 controls the flow of gas from line 232 through normally open line 236 and normally closed line 238. Gas line 240 branches from normally open gas line 236 and leads to a piston cylinder 242 having a spring biased piston 244. The piston shaft 246 is attached to the set-stop counter 200 by means of an interconnecting member 248.

Normally open line 236 leads to a reversing valve 250 having an exhaust 252. The position of valve 250 is controlled by a toggle switch 254.

A gas line 256 also leads from the valve 250 to a pneumatic motor 258. The spring biased piston 260 has its shaft 262 connected to a rack 264. The rack 264 is provided with an upper tappet 266 and a lower tappet 268. The teeth of the rack 264 are in engagement with a gear 270 mounted on a shaft 272. The shaft 272 is connected to the reset counter shaft 274 by means of a one-way clutch 276. The other end of reset counter shaft 274 is connected to a portion of a clutch mechanism 275.

A branch line 278 leads from line 232 to a normally closed valve 280. Under normal conditions there is no flow through valve 280, and the exhaust 282 is open to the outlet side of the valve line 290, exhausting only the minute amount of gas in line 290 between valve 280 and check valve 288. The position of valve 280 is controlled by a switch 284 which is actuated by an actuator 286 extending from the reset counter 202.

When actuator 286 actuates switch 284, the valve 280 is opened to permit the flow of gas through line 278, valve 280, check valve 288, and line 290 to the five-way diaphragm valve 234 to reverse the positions of the valves controlling the normally open line 236 and the normally closed line 238.

The normally closed line 238 leads to a piston cylinder 292 in which is disposed a spring biased piston 294. The shaft 296 of piston 294 is adapted to control the position of a reset lever 298 extending outwardly from the reset counter 202.

To explain the operation of FIG. 2, assume that the "daily allowable" is 100 barrels per day and that there is a 15-day production for a particular month so that the "monthly allowable" is 1,500 barrels with an over-all average of 100 barrels per day.

At the beginning of the first day's production, the set-stop counter will be set at 100. During the day, the oil is flowed through pipeline 12 to the destination. As each barrel of oil flows through meter 10, a pneumatic pulse is transmitted through valve 18, gas line 204, and against the piston 208. Actuation of the spring biased piston 208 causes ratched 214 to rotate the shaft 216 one count. At the end of 100 counts representing 100 barrels of flow through pipeline 12, a mechanism (not shown) within the set-stop counter 200 actuates actuator 218 to move the valve 222 to expose line 226 to the gas supply 224; gas is flowed through valve 222, line 226, shuttle valve 78, line 228, shuttle valve 82, and line 230 to shut the diaphragm valve 86, thus stopping the flow of oil through the pipeline 12.

At the beginning of the next day, the time cycle controller 88 opens a valve contained therein (not shown) to permit gas from supply 108 to flow through line 232, normally open line 236, branch line 240, and against the piston 244. This causes the shaft 246 to actuate the interconnecting member 248 so that the set-stop counter 200 is moved to the right, looking at FIG. 2, on the track 300. Thus, the clutch 275 engages the shaft 216 of the set-stop counter 200 with the shaft 274 of the reset counter 202. The line 236 also transmits the pulse through the reversing valve 250, line 256, and against the piston 260 in cylinder 258. This causes the rack 264 to be reciprocated up and down by a means to be explained later, causing the reset counted to rotate from 100 backwards to zero. The rotation backwards of reset counter 202 rotates the set-stop counter 200 forward through clutch 275, adding 100 counts to it.

Diaphragm valve 302 is included in line 236 and is operated to open the valve at a slightly higher pressure than the pressure necessary to engage clutch 275. This makes certain that the clutch is engaged before the rack 264 is actuated.

When rack 264 is moved to its uppermost position, the tappet 268 moves toggle switch 254 upwardly. Thus, the gas within the cylinder 258 is exhausted to return the rack back to its lowermost position as shown in FIG. 2.

When the reset counter 202 returns to the zero position, a mechanism (not shown) actuates actuator 286 which moves switch 284 to change the position of valve 280. Gas then flows through line 278, valve 280, check valve 288, and line 290 to the five-way diaphragm valve 234 to shut off flow from gas line 232 to the normally open lines 236 and 240, exhausting lines 236 to 240 to the atmosphere, and switching the flow to normally closed line 238. Shutting off flow of gas to gas lines 236 and 240 and exhausting them to the atmosphere causes the clutch 275 to become disengaged and causes piston 260 to stop reciprocating and return to its bottom position. The gas flowing through gas line 238 into cylinder 292 drives piston 294 downward moving shaft 296 against the reset actuator 298. The reset actuator shifts the reset counter wheels (not shown), by means of a series of cams (not shown), back to the "daily allowable" figure of 100. Resetting the counter wheels causes the actuator 286 to be moved out of contact with switch 284 of valve 280, allowing valve 280 to close and exhaust the gas trapped between valve 280 and check valve 288 to the atmosphere.

After a lapse of time sufficient for all of the above-described functions to be performed, say 5 minutes, the time cycle controller 88 would shut off the gas from gas supply 108 to gas line 232 and open gas line 232 to the atmosphere. This would allow all of the gas remaining in gas line 290 to move through check valve 301 into line 278, on through lines 232 and thus to the atmosphere. Valve 234 would be allowed to shift to its normal position, allowing the gas in line 238 to exhaust to the atmosphere and thus allowing piston 294 and reset actuator 298 to return to normal positions. Also, the flow control valve 86 would be allowed to open, and the fluid flow through pipeline 12 to be resumed.

If, however, only 90 barrels were flowed through the pipeline 12 during the first day's production, the actuator 218 of set-stop counter 200 will not be actuated, and the pipeline will continue to produce into the next day's production. At the end of the first day's production, the counter will read 10 representing the make-up to be made up during the second day's production period. At the beginning of the next day's production period, the entire cycle described above beginning with the opening of the time cycle controller is repeated. This will cause the set-stop counter 200 to read 110 at the end of the cycle, that is 100 for the next day added to the 10 remaining from the previous day. Thus, during the second day's production period, the flow of oil through pipeline 12 will not be stopped until the set-stop counter 200 is returned to the zero mark so that the over-all average for the two days' production is 100 barrels per day.

As production is continued throughout the month, when the total number of barrels flowed through pipeline 12 reaches, say 1,500 barrels, the mechanism within the master set-stop 140 is actuated to cause gas to be supplied through line 144, shuttle valve 78, line 228, shuttle valve 82, and line 230 to the diaphragm valve 86, thus shutting off the flow of fluid through pipeline 12.

I claim:

1. A system for limiting the quantity of fluid measured during a first predetermined time period and making up the limit during a second predetermined time period if the limit is not reached during the first predetermined time period comprising: means for detecting successive increments of fluid and generating corresponding successive pneumatic pulses; means for receiving said pulses, said pulse receiving means being movable in response to each of said successive pulses; pneumatic means responsive to a predetermined total movement only of said pulse receiving means, which predetermined total movement is proportional to the limit of the quantity of fluid, for stopping the measurement of the fluid; and a time controlled pneumatic supply for setting back the pulse receiving means an amount proportional to the fluid limit.

2. A system for limiting the quantity of fluid flowed through a pipeline during a first predetermined time period and making up the limit during a second predetermined time period if the limit is not reached during the first predetermined time period comprising: a meter actuated by fluid flow through the pipeline; a gas pulse generator; means actuated by said meter in response to successive equal increments of fluid flow through the pipeline for causing the pulse generator to generate corresponding successive pulses; a shaft rotatable in either direction; means including a piston responsive to each successive pulse from the pulse generator for rotating the shaft in one direction; means for stopping fluid flow through the pipeline; a gas supply leading to the flow stopping means and including a normally closed valve; means operated by the shaft only when the limit of fluid flow is reached to open said normally closed valve and stop the fluid flow through the pipeline; and means including a time controlled gas supply for rotating said shaft in the other direction at the end of a predetermined time period.

3. A system in accordance with claim 2 wherein the means including a piston responsive to each successive pulse from the pulse generator for rotating the shaft in one direction includes: a set-stop counter having a counter rotated successive equal amounts by the piston, a normally closed valve controiling a gas supply to a piston-operated pawl, a first ratchet coaxial with said shaft, and means operated only when the counter rotates a predetermined amount proportional to the limit of fluid flow through the pipeline to open the valve to rotate the shaft a predetermined amount, said counter being thereafter automatically reset; and the means including a time controlled gas supply for rotating said shaft in the other direction also includes a second ratchet coaxial with said shaft, and a piston-operated pawl.

4. A system in accordance with claim 2 wherein the means including a piston responsive to each successive pulse from the pulse generator for rotating the shaft in one direction also includes: a set-stop counter having a set-stop shaft extending therethrough, a ratchet wheel on the set-stop shaft, and a pawl connected to said piston and engageable with said ratchet wheel; and the means including a time controlled gas supply for rotating said shaft in the other direction also includes a pneumatic motor operated reset shaft which engages said set-stop shaft at the end of a predetermined time period to rotate said shaft in the other direction an amount proportional to the fluid flow limit.

No references cited.